United States Patent [19]

Tufts et al.

[11] Patent Number: 4,652,620
[45] Date of Patent: Mar. 24, 1987

[54] RESINOUS MOLDING COMPOSITIONS OF A PHENOL, AN OXAZOLINE AND AN EPOXY COMPOUND

[75] Inventors: Timothy A. Tufts, Columbus; Billy M. Culbertson, Worthington, both of Ohio

[73] Assignee: Ashland Oil, Inc., Russell, Ky.

[21] Appl. No.: 784,399

[22] Filed: Oct. 4, 1985

Related U.S. Application Data

[63] Continuation-in-part of Ser. No. 642,013, Aug. 20, 1984, abandoned.

[51] Int. Cl.$^4$ .............................................. C08G 59/06
[52] U.S. Cl. .................................... 525/504; 428/436; 428/524; 525/502; 528/98; 528/104; 528/117; 528/153; 528/155; 528/163; 528/211
[58] Field of Search ................. 525/502, 504; 528/98, 528/104, 117, 153, 155, 163, 211

[56] References Cited

U.S. PATENT DOCUMENTS

| | | | |
|---|---|---|---|
| 3,630,996 | 12/1971 | Tomalia | 528/117 |
| 3,640,957 | 2/1972 | Tomalia et al. | 528/117 |
| 3,716,520 | 2/1973 | Tomalia | 528/117 |
| 3,737,408 | 6/1973 | Hunsucker | 528/205 X |
| 3,749,683 | 7/1973 | Tomalia et al. | 528/117 |
| 3,755,257 | 8/1973 | Hunsucker | 528/163 |
| 3,784,508 | 1/1974 | Tomalia et al. | 528/117 |
| 3,822,237 | 7/1974 | Alford et al. | 528/104 X |
| 4,195,154 | 3/1980 | Kaiser et al. | 528/98 |
| 4,430,491 | 2/1984 | Culbertson et al. | 528/153 |
| 4,480,083 | 10/1984 | Tortorello et al. | 528/117 X |
| 4,560,732 | 12/1985 | Kojo et al. | 528/98 |

*Primary Examiner*—Howard E. Schain
*Attorney, Agent, or Firm*—Vernon F. Venne; Herbert M. Hanegan; Mary E. Picken

[57] ABSTRACT

The disclosure is directed to thermoset resinous compositions having utility in the area of surface coating and molding applications, the latter including the preparation of high performance composites and the use in reaction injection molding processes. The contemplated compositions are obtained by polymerizing a reaction mixture comprising a polyfunctional 2-oxazoline compound, a compound or oligomer containing a plurality of aromatic hydroxyl groups and a polyfunctional epoxide.

13 Claims, No Drawings

4,652,620

RESINOUS MOLDING COMPOSITIONS OF A PHENOL, AN OXAZOLINE AND AN EPOXY COMPOUND

CROSS REFERENCE TO RELATED APPLICATION

This is a continuation-in-part of application Ser. No. 642,013 filed Aug. 20, 1984, now abandoned.

BACKGROUND OF THE INVENTION

1. Field of the Invention

This invention relates to crosslinked resinous compositions resulting from polymerizing a mutually reactable monomer mixture of a multifunctional epoxide, a multifunctional phenolic component and a multifunctional 2-oxazoline.

2. Description of the Prior Art

It is known that a 2-oxazoline compound will react with a compound containing an active hydrogen atom of sufficient acid strength in a ring opening type of mechanism to provide a secondary amide. An aromatic hydroxyl group is representative of an active hydrogen containing compound capable of undergoing this reaction. The indicated reaction mechanism has heretofore been availed of to prepare resinous compositions in systems wherein the respective reactants are multifunctional in nature. Resinous compositions of the foregoing type are taught in U.S. Pat. No. 4,430,491.

It is likewise known that a variety of multifunctional phenolics, especially the novolacs, serve as agents for curing a multifunctional epoxide when these reactants are combined in an approximate stoichiometrical relationship, (Cf. *Handbook of Epoxy Resins*, by H. Lee and K. Neville, McGraw Hill Book Co., 1967). While not as extensively investigated as phenolic compounds, multifunctional oxazolines have nonetheless been reported in the literature and patents as representing suitable curing agents for multifunctional epoxides. U.S. Pat. No. 3,716,520 is exemplary of such patents. Also, an oxazoline or more specifically, a bicyclic adduct thereof with an oxirane oxygen group bearing compound is taught in U.S. Pat. No.3,640,957 as being a suitable catalyst for curing a multifunctional epoxide.

SUMMARY OF THE INVENTION

In accordance with this invention substantially insoluble and infusible cross-linked resinous compositions are provided which beyond possessing comparatively rapid cure characteristics and excellent mechanical properties singularly exhibit high temperature resistance properties in a variety of molding applications. The resinous compositions are derived by effecting the step-growth polymerization reaction in the melt phase of a tripartite reactant mixture of a multifunctional epoxide; i.e., a compound or oligomeric material containing oxirane oxygen groups; a phenolic compound or oligomer containing at least two aromatic hydroxyl groups; and a compound containing at least two 2-oxazoline groups. The respective epoxides and said aromatic hydroxyl group bearing materials are selected for use in combination with the oxazoline compound to provide a resultant cross-linked or thermoset product.

DESCRIPTION OF THE PREFERRED EMBODIMENTS

The oxazolines useful in the practice of this invention include a variety of such compounds having at least two 2-oxazoline groups. From the standpoint of potential commercial availability in commodity proportions the oxazolines derived from the polycarboxylic acids are preferred. Particularly exemplary of such polyacids are the aromatic acids; e.g., isophthalic acid, terephthalic acid and trimesic acid. The indicated polyfunctional oxazoline compounds can be conveniently prepared by the reaction of the corresponding esters of said polyacids and ethanolamines.

An enumeration of representative multifunctional oxazoline compounds useful in the practice of this invention, particularly the bis-oxazolines, is as follows: 4,4',5,5'-tetrahydro-2,2'-bisoxazole; a 2,2'-(alkanediyl) bis [4,5-dihydrooxazole], e.g., 2,2'-(1,4-butanediyl) bis [4,5-dihydrooxazole]; a 2,2'-(arylene) bis [4,5-dihydrooxazole], e.g., 2,2'-(1,4-phenylene) bis [4,5-dihydrooxazole], 2,2'(1,5-naphthalenyl) bis [4,5-dihydrooxazole] and 2,2'-(1,8-anthracenyl) bis [4,5-dihydrooxazole]; a sulfinyl, oxy, thio or alkylene bis 2-(arylene) [4,5-dihydrooxazole], e.g., sulfonyl bis 2,2'-(1,4-phenylene) [4,5-dihydrooxazole], oxy bis 2,2'-(1,4-phenylene) [4,5-dihydrooxazole], thio bis 2,2'-(1,4-phenylene) [4,5-dihydrooxazole] and methylene bis 2-(1,4-phenylene) [4,5-dihydrooxazole]; a 2,2',2''-(arylene) tris [4,5-dihydrooxazole], e.g., 2,2',2''-(1,3,5-phenylene) tris [4,5-dihydrooxazole]; oligomeric (polymeric) materials with pendent oxazoline groups such as poly [2-(alkenyl) 4,5-hydrooxazole] e.g., poly[2-(2-propenyl) 4,5-dihydrooxazole], as well as oligomeric materials having terminal oxazoline groups.

A like enumeration of representative compounds having at least two aromatic hydroxy groups useful in the practice of this invention, particularly the bisphenols, is as follows: the various benzene and fused aromatic ring diols and triols, e.g., 1,4-benzene diol (hydroquinone), 1,3-benzenediol (resorcinol), 1,4 naphthalene diol and 1,3,5 benzene triol; the biphenyl diols, e.g., [1,1'-biphenyl]- 2,2'-diol; the alkylene and cycloalkylene bisphenols, e.g., 2,2' methylene bisphenol, 4,4'-(1-methylethylidene) bisphenol (Bisphenol A), 4,4'-(phenylmethylene) bisphenol, 4,4'-(cyclohexanediyl) bisphenol, 4,4'-(1,2-diethyl -1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonylbisphenols, e.g., 2,3'-oxybisphenol 4,4'-thiobisphenol and 2,2'-sulfonyl bisphenol; the bis (hydroxyaryl) alkanones, e.g., bis (4-hydroxyphenyl) methanone, 1,5-dihydroxy - 9,10-anthracenedione and 4-[bis(4-hydroxyphenyl)methylene) - 2,5-cyclohexadiene-1-one; the various benzamide and benzoate derivatives, e.g., 2-hydroxy-N-(4-hydroxyphenyl) benzamide, 4-hydroxy - 4-hydroxyphenyl benzoate, 2-methyl - 2-[(4-hydroxybenzoyl) oxylmethyl]-1,3-propanediyl -4-hydroxybenzoate, bis (4-hydroxy benzoate)-1,2-ethandiyl; 2-(4-hydroxy benzoate)-1,2-ethandiyl; 2-(4-hydroxy benzoate) ethyl ether, bis (4-hydroxy benzamide)-1,6-hexanediyl and bis (4-hydroxy benzamide)-1,4-benzenediyl.

The above enumeration of oxazoline and phenolic compounds is, as specifically indicated, illustrative of the respective types of compounds useful in the practice of the invention. Besides the various isomers of these representative compounds, a variety of substituted compounds are likewise applicable. Examples of such substituent groups which will not interfere or compete with the various underlying reactions occurring in the indicated step-growth polymerization mechanism include: alkyl, aryl, halo, cyano, nitro, alkoxy, aryloxy, alkyl and aryl sulfides.

In addition to the phenolic compounds noted above a variety of oligomers containing a plurality of aromatic hydroxyl groups constitute an important class of materials for use in the practice of this invention. Particularly representative of such oligomers are the base or acid catalyzed phenol/formaldehyde condensation products preferably the latter condensates; viz., the novolacs. Besides the conventional resoles, the phenolic resins characterized in containing benzylic ether linkages prepared by metal ion catalysis such as disclosed in U.S. Pat. No. 3,485,797 are applicable. Other suitable polyphenol oligomers include the addition polymers and copolymers of a vinyl substituted phenol having pendent aromatic hydroxyl groups; e.g., (poly)4-ethenylphenol. Also oligomeric materials having terminal aromatic hydroxyl groups are suitable in the practice of this invention.

Due to the extensive use of the multifunctional epoxides, more generally referred to as epoxy resins, in surface coating and adhesive applications a variety of these products are commercially available. The glycidyl ethers of an aromatic polyol derived by reacting an aromatic polyol, especially bisphenol A, with epichlorohydrin represent a particularly exemplary class of epoxy resins. In addition to resorcinol the novolacs containing a plurality of free aromatic hydroxyl groups prepared from phenol as well as bisphenol A provide glycidyl ether derivatives of a highly functional nature. Aliphatic epoxides, such as the glycidyl ethers of an aliphatic polyol and those commercial offerings based on epoxidized cyclohexene derivatives are also useful in the practice of the present invention. Identification of commercially available products corresponding to those generally described above as well as others can be found in the previously referenced *Handbook of Epoxy Resins*.

The method for obtaining the thermoset compositions of this invention basically involves effecting the step-growth polymerization reaction in a homogeneous melt phase of the respective reactants at a suitable temperature not in excess of about 150° C. followed by subsequent heating at a temperature in excess of about 175° C. In molding applications a sufficient degree of polymerization to allow for demolding can be accomplished generally in less than about ten minutes. In preparing laminated structures the usual procedure applies which consists of impregnating the individual cloth substrates with a solution of the reactants, drying and then heat and pressure consolidating a plurality of the prepregs to provide the desired assembly.

In view of the fact that the respective reactants contemplated in the practice of this invention are mutually reactable adherence to any hard and fast stoichiometrical relationships is not apropros. This is all the more so because of the nature of some of the initial products generated in the course of effecting polymerization. As the prior art points out the adduct formed between a molecule of a 2-oxazoline and an oxirane oxygen containing group serves as a catalyst for homopolymerizing the epoxide reactant in a competing type reaction. Also, for example, the oxazoline in reacting with an aromatic hydroxyl group generates an amido group which in turn is capable of reacting with both an oxazoline and an oxirane oxygen containing group. Notwithstanding the foregoing an ample presence of each of the contemplated reactants is viewed as having an important bearing with respect to the overall improved properties exhibited by the resultant product. Accordingly, an empirical minimum amount in the order of preferably at least about 20 wt. % of each reactant, is contemplated.

The following working examples are given for the purpose of illustrating the invention and presenting the best mode contemplated for carrying out same. All parts and percentages are by weight unless otherwise indicated.

EXAMPLE I

This example serves to illustrate the improved temperature resistance property associated with the thermoset compositions of this invention. Two standard test samples were prepared of which Sample A (the invention) was compared to the comparitive prior art Sample B. Details concerning the compositional makeup of these test samples and the indicated test results are given in the following Table I.

TABLE I

| Sample | Epon 828 (Shell) | Alnovol PN 320 (Amer. Horscht) | Bisoxazoline of Isophthalic Acid | Cat. | Tq by DSC |
|---|---|---|---|---|---|
| A | 1 part | 1 part | 1 part | None | 150° C. |
| B | 1 part | 1 part | — | *BDMA | 117° C. |

*BDMA = Benzyldimethyl amine

EXAMPLE II

Laminated composites were prepared using a representative resin composition in accordance with this invention in the following manner. A solution of 200 g Alnovol PN 320 (American Hoechst), 200 g. Epon 828 (Shell) and 200 g. 2,2'-bis [1,3-phenylene (4,5-dihydrooxazole)] in 400 g. acetone was prepared. An 11" wide strip of Hexcell 7781 glass cloth was impregnated with said solution and dried providing a 35% resin pickup. Twelve pieces (3"×5") were cut, stacked and placed in a mold and heated at 350° F. for 15–20 minutes at a pressure of 50 psig. The assemblies were demolded while hot and then cooled resulting in a resin content of 30–31%. Flex strength and flex modulus were determined for the test samples as molded and after further heating for 20 hours at 400° F. in a post-curing stage. The results obtained are tabulated in the following Table II.

TABLE II

| Sample | Post Cure | Test Temp. | Flex Strength (psi) | Flex Modulus (psi) |
|---|---|---|---|---|
| 2 | No | 72° F. | 124,800 | 4.6 × 10$^6$ |
| 3 | Yes | 72° F. | 115,300 | 4.1 × 10$^6$ |
| 4 | Yes | 250° F. | 85,000 | 3.1 × 10$^6$ |
| 5 | Yes | 300° F. | 57,000 | 3.0 × 10$^6$ |

EXAMPLE III

A surface coating composition was prepared consisting of one part Alnovol PN 320 (Amer. Hoescht), 1.5 parts of the aliphatic bisepoxide DER732 (Dow) and 1 part of 2,2'-bis[1,4-tetramethylene(4,5-dihydrooxazole)] dissolved in acetone. The solution was drawn down on glass and dried. The tacky film was heated at 300° F. for 3–5 minutes to provide a flexible tough coating.

What is claimed is:

1. A substantially infusible and insoluble resinous composition prepared by effecting the step-growth polymerization reaction in the melt phase of a tripartite reactant mixture consisting essentially of (1) a compound having at least two 2-oxazoline groups, (2) a phenolic compound or oligomer containing at least two aromatic hydroxyl groups, and (3) a multi-functional epoxide wherein each of the reactants (1), (2), and (3) is present in the amount of at least 20% by weight.

2. The resinous composition according to claim 1 wherein said multifunctional epoxide is a glycidyl ether derivative of an aromatic polyol, an aliphatic polyol, or a phenol/aldehyde oligomeric condensate.

3. The resinous composition according to claim 2 wherein said glycidyl ether derivative is that of an aromatic polyol.

4. The resinous composition according to claim 3 wherein said glycidyl ether derivative is that of bisphenol A.

5. The resinous composition according to claim 2 wherein said glycidyl ether derivative of a phenol/aldehyde oligomeric condensate is that of a novolak.

6. The resinous composition according to claim 4 wherein said oligomer containing at least two aromatic hydroxyl groups is a phenol/formaldehyde condensate.

7. The resinous composition according to claim 6 wherein said phenol/formaldehyde condensate is a novolak.

8. The resinous composition according to claim 5 wherein said oligomer containing at least two aromatic hydroxyl groups is a phenol/formaldehyde condensate.

9. The resinous composition according to claim 8 wherein said phenol/formaldehyde condensate is a novolak.

10. The resinous composition according to claims 4, 5, 7 or 9 wherein said oxazoline compound is a bisoxazoline.

11. The resinous composition according to claim 10 wherein said bisoxazoline is an arylene bisoxazoline.

12. The resinous composition according to claim 11 wherein said arylene bisoxazoline is a phenylene bisoxazoline.

13. The resinous composition according to claim 10 wherein said bisoxazoline is an alkylene bisoxazoline or an alkylidene bisoxazoline.

* * * * *